US009623811B2

(12) United States Patent
Alexander et al.

(10) Patent No.: US 9,623,811 B2
(45) Date of Patent: Apr. 18, 2017

(54) DEPLOYABLE CAMERA SYSTEMS (71) Applicants: GM GLOBAL TECHNOLOGY OPERATIONS LLC, Detroit, MI (US); DYNALLOY, INC., Tustin, CA (US)

(72) Inventors: Paul W. Alexander, Ypsilanti, MI (US); Debbie E Nachtegall, Rochester Hills, MI (US); Nancy L. Johnson, Northville, MI (US); Scott R. Webb, Macomb Township, MI (US); James Ryan Yates, Mission Viejo, CA (US); James Holbrook Brown, Temecula, CA (US); Aragorn Zolno, Whittier, CA (US)

(73) Assignees: GM Global Technology Operations LLC, Detroit, MI (US); DYNALLOY, INC., Tustin, CA (US)

( * ) Notice: Subject to any disclaimer, the term of this patent is extended or adjusted under 35 U.S.C. 154(b) by 634 days.

(21) Appl. No.: 14/168,457

(22) Filed: Jan. 30, 2014

(65) Prior Publication Data
US 2014/0211010 A1    Jul. 31, 2014

Related U.S. Application Data

(60) Provisional application No. 61/759,014, filed on Jan. 31, 2013.

(51) Int. Cl.
*H04N 7/18* (2006.01)
*B60R 11/04* (2006.01)
*B60R 11/00* (2006.01)

(52) U.S. Cl.
CPC ........ *B60R 11/04* (2013.01); *B60R 2011/004* (2013.01); *B60R 2011/0094* (2013.01)

(58) Field of Classification Search
USPC ............................ 348/143, 148, 151, E7.085
See application file for complete search history.

(56) References Cited

U.S. PATENT DOCUMENTS

| 7,017,345 B2 * | 3/2006 | Von Behrens | .......... F03G 7/065 60/527 |
|---|---|---|---|
| 2010/0027119 A1 * | 2/2010 | Kollar | .................... G02B 23/16 359/507 |
| 2013/0028588 A1 * | 1/2013 | Suman | .................. G03B 17/00 396/448 |

* cited by examiner

*Primary Examiner* — Christopher S Kelley
*Assistant Examiner* — Ana Picon-Feliciano
(74) *Attorney, Agent, or Firm* — Quinn IP Law (57) ABSTRACT

A deployable camera system for a vehicle includes a body defining a cavity therein, and a camera including a housing having an exterior surface. The camera is reversibly transitionable between a stowed position in which the camera is recessed into the cavity and the exterior surface is substantially flush with the body, and a deployed position wherein the camera protrudes from the cavity and the exterior surface is not substantially flush with the body. The deployable camera system includes a first shape memory alloy element transitionable between a first state and a second state in response to a first thermal activation signal.

13 Claims, 5 Drawing Sheets

DEPLOYABLE CAMERA SYSTEMS

CROSS-REFERENCE TO RELATED APPLICATIONS

This application claims the benefit of U.S. Provisional Patent Application No. 61/759,014, filed Jan. 31, 2013, which is hereby incorporated by reference in its entirety.

TECHNICAL FIELD

The disclosure relates to a deployable camera system for a vehicle.

BACKGROUND

Vehicles may include camera systems configured to monitor conditions within, or exterior to, a passenger compartment of the vehicle. For example, a camera system may monitor road surface conditions, traffic conditions, and/or a position or condition of objects or occupants within the passenger compartment.

SUMMARY

A deployable camera system for a vehicle includes a body defining a cavity therein, and a camera including a housing having an exterior surface. The camera is reversibly transitionable between a stowed position in which the camera is recessed into the cavity and the exterior surface is substantially flush with the body, and a deployed position in which the camera protrudes from the cavity and the exterior surface is not substantially flush with the body. The deployable camera system also includes a latch translatable between a latched position wherein the camera is not transitionable between the stowed position and the deployed position, and an unlatched position wherein the camera is transitionable between the stowed position and the deployed position. Further, the deployable camera system includes a first shape memory alloy element transitionable between a first state and a second state in response to a first thermal activation signal to thereby transition the camera to the deployed position. In addition, the deployable camera system includes a first resilient member coupled to the housing.

In one embodiment, the deployable camera system includes a linkage abutting the housing and configured for pivoting about a first axis between a first position wherein the camera is disposed in the stowed position, and a second position wherein the camera is disposed in the deployed position. Further, the deployable camera system includes a first shape memory alloy element coupled to the linkage and transitionable between a first state and a second state in response to a first thermal activation signal to thereby pivot the housing about a second axis that is substantially parallel to the first axis so that the linkage pivots from the first position to the second position. The deployable camera system also includes a second shape memory alloy element coupled to the linkage and transitionable between the first state and the second state in response to a second thermal activation signal to thereby pivot the housing about the second axis so that the linkage pivots from the second position to the first position.

In another embodiment, the deployable camera system includes a member defining a channel therein, and a pin operably coupled to the camera and translatable within the channel. In addition, the deployable camera system includes a first shape memory alloy element coupled to the pin and transitionable between a first state and a second state in response to a first thermal activation signal to thereby translate the pin within the channel between an initial position wherein the camera is disposed in the stowed position; a secondary position wherein the camera is disposed in the deployed position and the first shape memory alloy element is in the second state; a nominal position wherein the camera is disposed in the deployed position and the first shape memory alloy element is in the first state; and a tertiary position wherein the camera is disposed in the deployed position and the first shape memory alloy element is in the second state.

The detailed description and the drawings or Figures are supportive and descriptive of the disclosure, but the scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Referring to the Figures, wherein like reference numerals refer to like elements, a deployable camera system 10, 110, 210, 310 for a vehicle 12 (FIG. 1) is shown generally in FIGS. 1-9B. The deployable camera system 10, 110, 210, 310 may be useful for on-demand or selective monitoring applications. That is, as set forth in more detail below, the deployable camera system 10, 110, 210, 310 may be selectively deployed when desired. For example, the deployable camera system 10, 110, 210, 310 may be useful for monitoring the presence, position, and/or condition of an operator of the vehicle 12 and may be a component of a driver monitoring system and/or hands-free or autonomous driving system for the vehicle 12. Conversely, the deployable camera system 10, 110, 210, 310 may retract from view when monitoring is complete. Therefore, the deployable camera system 10, 110, 210, 310 may be useful for automotive vehicles, but may also be useful for non-automotive vehicles, such as, but not limited to, recreational vehicles and aircraft.

Figure 1:
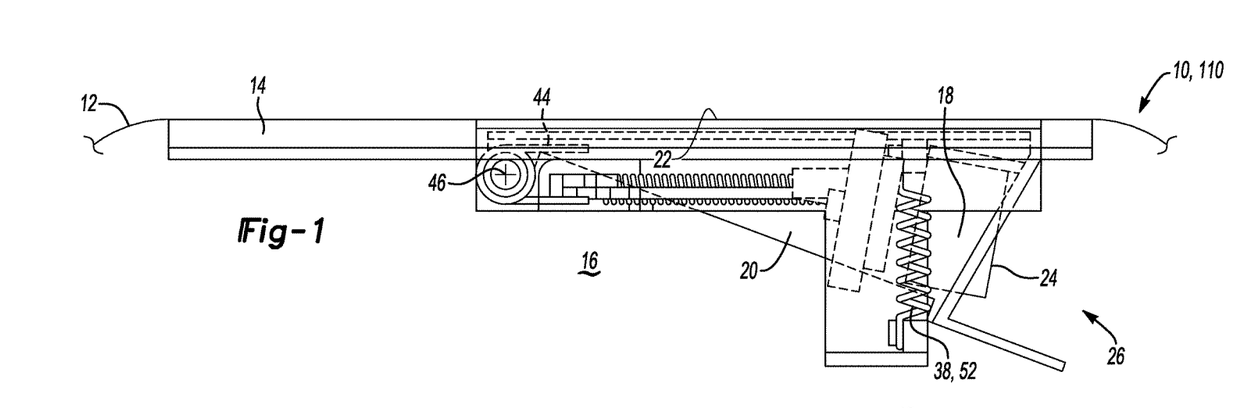
FIG. 1 is a schematic illustration of a side view of a deployable camera system including a camera and a latch, wherein the camera is disposed in a stowed position.

Referring now to FIG. 1, the deployable camera system 10, 110 includes a body 14 defining a cavity 16 therein. The body 14 may be any component of the vehicle 12, such as, but not limited to, a steering column of the vehicle 12. That is, the body 14 may be configured as a shroud, and may define the cavity 16 or open space therein.

With continued reference to FIG. 1, the deployable camera system 10, 110 also includes a camera 18 including a housing 20 having an exterior surface 22. The housing 20 may protect the camera 18, and may be formed from any material, such as plastic, metal, e.g., magnesium, and the like. Further, the exterior surface 22 may be visible to an occupant of the vehicle 12, and as such may be formed from any suitable material according to vehicle styling. For example, the exterior surface 22 may be formed from the same material as the body 14 or steering column.

Moreover, the camera 18 may be any suitable type of camera 18, such as, but not limited to, an infrared camera, and may include a lens 24. Generally, the lens 24 may be an optical lens having a field of vision, e.g., in front of the camera 18, and may be configured for collecting light so that the camera 18 may produce an image. In addition, although not shown, the deployable camera system 10, 110 may include a plurality of cameras 18, e.g., two or more cameras 18 disposed within with a respective one of a plurality of cavities 16 (not shown).

Figure 2:
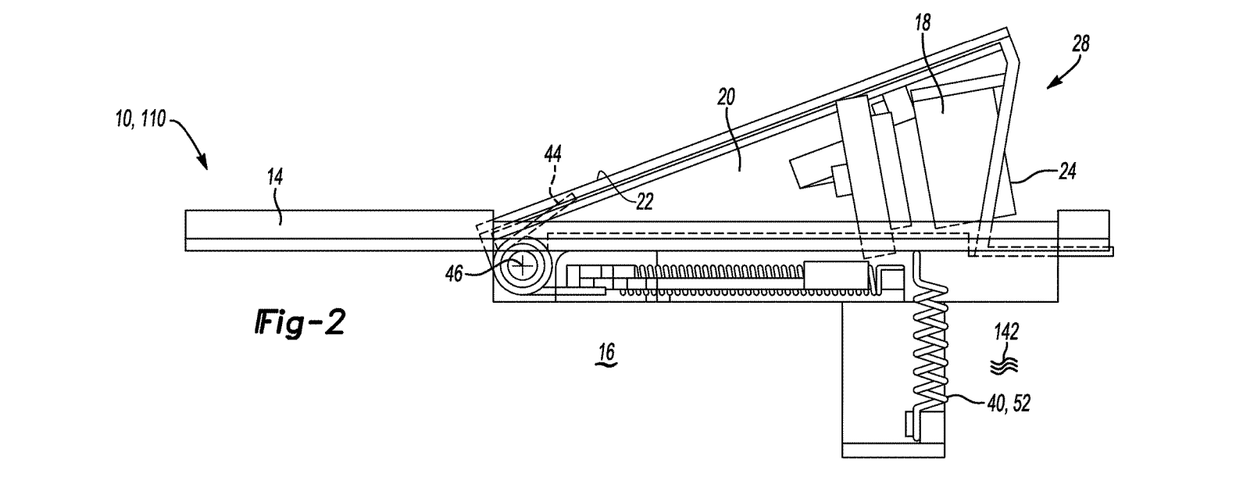
FIG. 2 is a schematic illustration of a side view of the deployable camera system of FIG. 1, wherein the camera is disposed in a deployed position.

Referring now to FIGS. 1 and 2, the camera 18 is reversibly transitionable between a stowed position 26 (FIG. 1) in which the camera 18 is recessed into the cavity 16 and the exterior surface 22 is substantially flush with the body 14, and a deployed position 28 (FIG. 2) in which the camera 18 protrudes from the cavity 16 and the exterior surface 22 is not substantially flush with the body 14. The camera 18 and lens 24 may produce images when the camera 18 is disposed in the deployed position 28, and may not be visible to a vehicle operator when the camera 18 is disposed in the stowed position 26. Further, when the camera 18 is disposed in the stowed position 26, the exterior surface 22 may be sealed with respect to the body 14 to minimize ingress of contaminants, such as dust and/or fluids, into the cavity 16.

Figure 3:
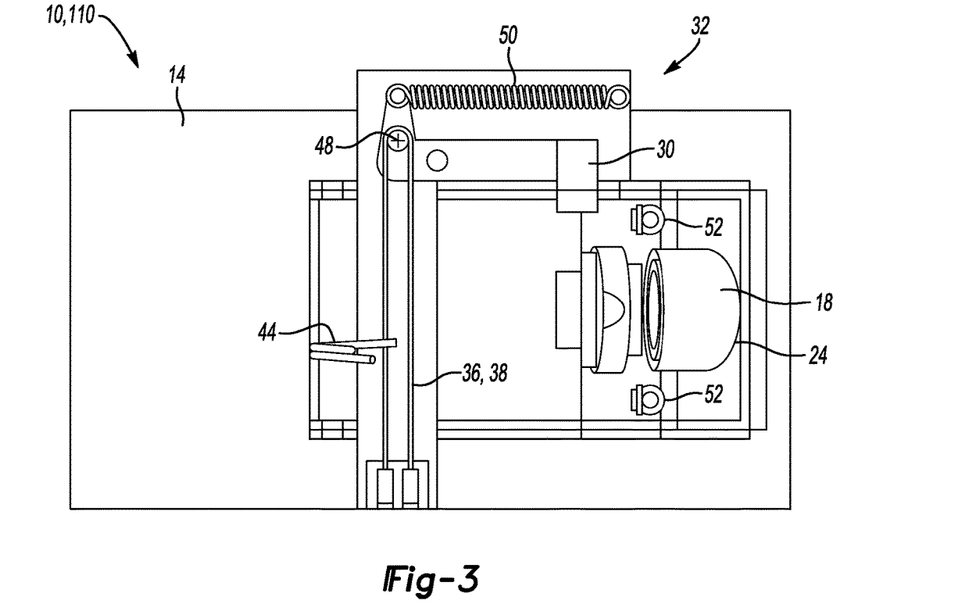
FIG. 3 is a schematic illustration of a top view of the deployable camera system of FIGS. 1 and 2, wherein the latch is disposed in a latched position.
Figure 4:
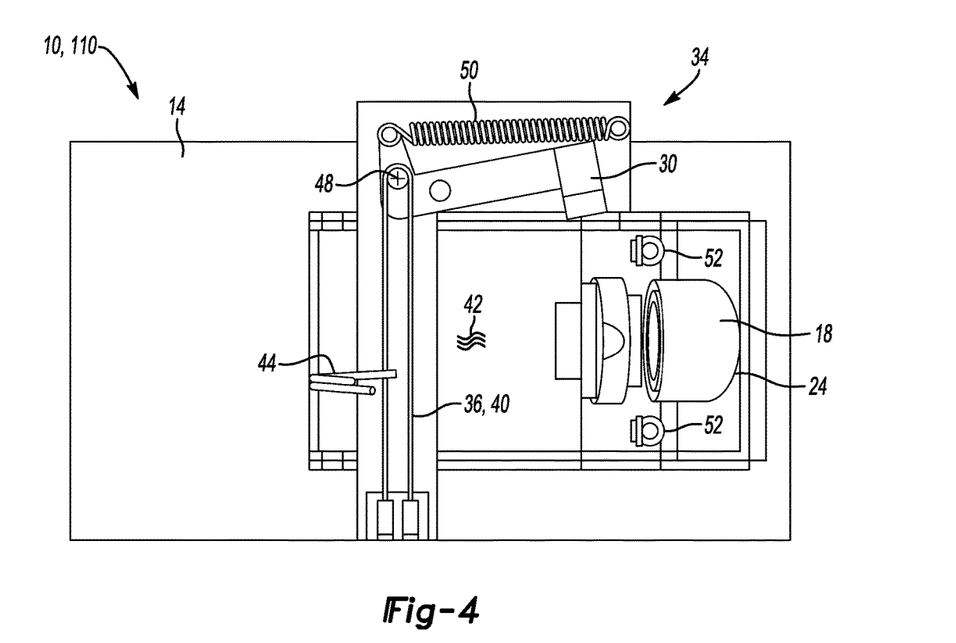
FIG. 4 is a schematic illustration of a top view of the deployable camera system of FIG. 3, wherein the latch is disposed in an unlatched position.

Referring now to FIGS. 3 and 4, the deployable camera system 10, 110 further includes a latch 30 translatable between a latched position 32 (FIG. 3) wherein the camera 18 is not transitionable between the stowed position 26 (FIG. 1) and the deployed position 28 (FIG. 2), and an unlatched position 34 (FIG. 4) wherein the camera 18 is transitionable between the stowed position 26 and the deployed position 28. That is, when the latch 30 is disposed in the latched position 32, the camera 18 may not translate between the stowed position 26 and the deployed position 28. Conversely, when the latch 30 is disposed in the unlatched position 34, the camera 18 may translate between the stowed position 26 and the deployed position 28. Therefore, as set forth in more detail below, the latch 30 may retain the camera 18 in the stowed position 26 and/or the deployed position 28.

With continued reference to FIGS. 3 and 4, the deployable camera system 10, 110 also includes a first shape memory alloy element 36 transitionable between a first state 38 (FIG. 3) and a second state 40 (FIG. 4) in response to a first thermal activation signal (represented generally at 42 in FIG. 4) to thereby transition the camera 18 to the deployed position 28 (FIG. 2). For example, the first shape memory alloy element 36 may be coupled to the latch 30, and the first shape memory alloy element 36 may translate the latch 30 between the latched position 32 (FIG. 3) and the unlatched position 34 (FIG. 4). Therefore, as set forth in more detail below, as the first shape memory alloy element 36 transitions between the first state 38 and the second state 40, the latch 30 may translate between the latched position 32 and the unlatched position 34 so that the camera 18 may transition between the stowed position 26 (FIG. 1) and the deployed position 28.

As used herein, the terminology "shape memory alloy" refers to alloys that exhibit a shape memory effect and have the capability to quickly change properties in terms of stiffness, spring rate, and/or form stability. That is, the shape memory alloy may undergo a solid state crystallographic phase change via molecular or crystalline rearrangement to shift between a martensite phase, i.e., "martensite", and an austenite phase, i.e., "austenite". That is, the shape memory alloy may undergo a displacive transformation rather than a diffusional transformation to shift between martensite and austenite. A displacive transformation is defined as a structural change that occurs by the coordinated movement of atoms or groups of atoms relative to neighboring atoms or groups of atoms. Further, the martensite phase generally refers to the comparatively lower-temperature phase and is often more deformable than the comparatively higher-temperature austenite phase.

The temperature at which the shape memory alloy begins to change from the austenite phase to the martensite phase is known as the martensite start temperature, $M_s$. The temperature at which the shape memory alloy completes the change from the austenite phase to the martensite phase is known as the martensite finish temperature, $M_f$. Similarly, as the shape memory alloy is heated, the temperature at which the shape memory alloy begins to change from the martensite phase to the austenite phase is known as the austenite start temperature, $A_s$. The temperature at which the shape memory alloy completes the change from the martensite phase to the austenite phase is known as the austenite finish temperature, $A_f$.

The first shape memory alloy element 36 may have any suitable form, i.e., shape. For example, the first shape memory alloy element 36 may be configured as a shape-changing element such as a straight wire (FIG. 3), helical spring, tape, band, continuous loop, and combinations thereof. Further, the shape memory alloy may have any suitable composition. In particular, the shape memory alloy may include in combination an element selected from the group of cobalt, nickel, titanium, indium, manganese, iron, palladium, zinc, copper, silver, gold, cadmium, tin, silicon, platinum, and gallium. For example, suitable shape memory alloys may include nickel-titanium based alloys, nickel-aluminum based alloys, nickel-gallium based alloys, indium-titanium based alloys, indium-cadmium based alloys, nickel-cobalt-aluminum based alloys, nickel-manganese-gallium based alloys, copper based alloys (e.g., copper-zinc alloys, copper-aluminum alloys, copper-gold alloys, and copper-tin alloys), gold-cadmium based alloys, silver-cadmium based alloys, manganese-copper based alloys, iron-platinum based alloys, iron-palladium based alloys, and combinations of one or more of each of these combinations. The shape memory alloy can be binary, ternary, or any higher order so long as the shape memory alloy exhibits a shape memory effect, e.g., a change in shape orientation, damping capacity, and the like. Generally, the shape memory alloy may be selected according to desired operating temperatures of the deployable camera system 10, 110, 210, 310. In one specific example, the shape memory alloy may include nickel and titanium.

Therefore, in one example described with reference to FIGS. 3 and 4, the first shape memory alloy element 36 may be configured as a straight wire. In another example, although not shown, the first shape memory alloy element 36 may be configured as a helical spring. The first shape memory alloy element 36 formed from the shape memory alloy may be characterized by the first state 38 (FIG. 3), i.e., when a temperature of the shape memory alloy is below the martensite finish temperature, $M_f$, of the shape memory alloy. Likewise, the first shape memory alloy element 36 formed from the shape memory alloy may also be characterized by the second state 40 (FIG. 4), i.e., when the temperature of the shape memory alloy is above the austenite finish temperature, $A_f$, of the shape memory alloy. In addition, as described in more detail below, the deployable camera system 10, 110 may include a plurality of first shape memory alloy elements 36.

Referring again to FIGS. 3 and 4, the first shape memory alloy element 36 may contract in length in response to the first thermal activation signal 42 (FIG. 4) to thereby translate the latch 30 to the unlatched position 34 (FIG. 4). That is, the first shape memory alloy element 36 may transition from the first state 38 (FIG. 3), e.g., a cold state, to the second state 40 (FIG. 4), e.g., a hot state, and the first shape memory alloy element 36 may accordingly contract in length. As the first shape memory alloy element 36 contracts in length in response to the first thermal activation signal 42, the first shape memory alloy element 36 may actuate, e.g., pull on, the latch 30 to thereby translate the latch 30 from the latched position 32 to the unlatched position 34. After translating the latch 30, the first thermal activation signal 42 may be removed from the first shape memory alloy element 36, and the first shape memory alloy element 36 may relax so that the first shape memory alloy element 36 elongates in length and thereby returns the latch 30 to the latched position 32 (FIG. 3). That is, the first thermal activation signal 42 may be removed from the first shape memory alloy element 36 so that the first shape memory alloy element 36 transitions from the second state 40, e.g., the hot state, to the first state 38, e.g., the cold state, and thereby returns the latch 30 to the latched position 32.

Conversely, although not shown, latch operation may be reversed. The first shape memory alloy element 36 may contract in length in response to the first thermal activation signal 42 (FIG. 4) to thereby translate the latch 30 to the unlatched position 34 (FIG. 4). That is, the first shape memory alloy element 36 may transition from the first state 38 (FIG. 3), e.g., a cold state, to the second state 40 (FIG. 4), e.g., a hot state, and the first shape memory alloy element 36 may accordingly contract in length. As the first shape memory alloy element 36 contracts in length in response to the first thermal activation signal 42, the first shape memory alloy element 36 may actuate, e.g., pull on or push on, the latch 30 to thereby translate the latch 30 from the unlatched position 34 to the latched position 32. After translating the latch 30, the first thermal activation signal 42 may be removed from the first shape memory alloy element 36, and the first shape memory alloy element 36 may relax so that the first shape memory alloy element 36 elongates in length and thereby returns the latch 30 to the unlatched position 34. That is, the first thermal activation signal 42 may be removed from the first shape memory alloy element 36 so that the first shape memory alloy element 36 transitions from the second state 40, e.g., the hot state, to the first state 38, e.g., the cold state, and thereby returns the latch 30 to the unlatched position 34.

Referring again to FIGS. 1 and 2, the deployable camera system 10, 110 also includes a first resilient member 44 coupled to the housing 20. The first resilient member 44 may be configured for transitioning the camera 18 to the deployed position 28 (FIG. 2) when the latch 30 is in the unlatched position 34 (FIG. 4) so that the exterior surface 22 is not substantially flush with the body 14. That is, the first resilient member 44 may be biased so that the camera 18 transitions to the deployed position 28 when the latch 30 is in the unlatched position 34. In other words, the first resilient member 44 may deploy the camera 18 when the latch 30 unlatches.

In one example, as shown in FIGS. 1 and 2, the first resilient member 44 may be configured as a torsion spring rotatable about a first axis 46. Further, as best shown in FIGS. 3 and 4, the latch 30 may be pivotable about a second axis 48 that is substantially perpendicular to the first axis 46. Therefore, as the latch 30 unlatches, the housing 20 may be pivotable about the first axis 46 as the camera 18 transitions between the stowed position 26 (FIG. 1) and the deployed position 28 (FIG. 2). In another example, although not shown, the first resilient member 44 may be configured as a helical spring.

In addition, the deployable camera system 10, 110 may further include a second resilient member 50 (FIGS. 3 and 4) attached to the latch 30 and configured for translating the latch 30 from the unlatched position 34 (FIG. 4) to the latched position 32 (FIG. 3). In one non-limiting, the second resilient member 50 may be configured as a helical spring and may assist the latch 30 in returning to and/or from the latched position 32.

With continued reference to FIGS. 1 and 2, the deployable camera system 10, 110 may further include a second shape memory alloy element 52 coupled to the housing 20 and transitionable between the first state 38 (FIG. 3) and the second state 40 (FIG. 4) in response to a second thermal activation signal (represented generally at 142 in FIG. 2) to thereby transition the camera 18 from the deployed position 28 (FIG. 2) to the stowed position 26 (FIG. 1). The second shape memory alloy element 52 may be the same as or different from the first shape memory alloy element 36 set forth above. Further, by way of non-limiting examples, the second shape memory alloy element 52 may be configured as a straight wire, a helical spring, and combinations thereof. In addition, the deployable camera system 10, 110 may include a plurality of second shape memory alloy elements 52, e.g., two, each coupled to the housing 20 and spaced apart from one another.

More specifically, the second shape memory alloy element 52 may contract in length in response to the second thermal activation signal 142 (FIG. 2) to thereby pivot the housing 20 about the first axis 46 so that the exterior surface 22 is substantially flush with the body 14 and the camera 18 is disposed in the stowed position 26 (FIG. 1). That is, the second shape memory alloy element 52 may contract in length in response to the second thermal activation signal 142 to thereby transition the camera 18 to the stowed position 26. In particular, the second shape memory alloy element 52 may transition from the first state 38 (FIG. 1), e.g., a cold state, to the second state 40 (FIG. 2), e.g., a hot state, and the second shape memory alloy element 52 may accordingly contract in length. As the second shape memory alloy element 52 contracts in length in response to the second thermal activation signal 142, the second shape memory alloy element 52 may actuate, e.g., pull on, the housing 20 to thereby pivot the housing 20 downward towards the cavity and transition the camera 18 from the deployed position 28 (FIG. 2) to the stowed position 26 (FIG. 1). After transitioning the camera 18, the second thermal activation signal 142 may be removed from the second shape memory alloy element 52, and the second shape memory alloy element 52 may relax so that the camera 18 remains in the stowed position 26 (FIG. 1). That is, the second thermal activation signal 142 may be removed from the second shape memory alloy element 52 so that the second shape memory alloy element 52 transitions from the second state 40, e.g., the hot state, to the first state 38, e.g., the cold state.

In addition, although not shown, the deployable camera system 10, 110 may further include a damper configured for decreasing a speed at which the camera 18 transitions between the stowed position 26 (FIG. 1) and the deployed position 28 (FIG. 2). That is, in the event that the camera 18 transitions to the deployed position 28 more quickly than desired, the damper may slow the speed at which the camera 18 deploys. Conversely, in the event that the camera 18 transitions to the stowed position 28 more quickly than desired, the damper may slow the speed at which the camera 18 is stowed. As such, the damper may be coupled to the first shape memory alloy element 36, the latch 30, and/or the first resilient member 44.

In another embodiment, as described with continued reference to FIGS. 1 and 2, the first resilient member 44 is coupled to the housing 20 and may be configured for disposing the camera 18 in the stowed position 26 (FIG. 1) so that the exterior surface 22 is substantially flush with the body 14. That is, the first resilient member 44 may be biased so that the camera 18 transitions to the stowed position 26. In other words, the first resilient member 44 may stow the camera 18. In one non-limiting example, the first resilient member 44 may be configured as a torsion spring rotatable about the first axis 46. Further, the latch 30 may be pivotable about the second axis 48 that is substantially perpendicular to the first axis 46. Therefore, the housing 20 may pivot about the first axis 46 as the camera 18 transitions to the stowed position 26 (FIG. 1), and the latch 30 may retain the camera 18 in the stowed position 26. In addition, the deployable camera system 10 may further include the second resilient member 50 coupled to the latch 30 and configured for translating the latch 30 between the latched position 32 (FIG. 4) and the unlatched position 34 (FIG. 3). In one non-limiting, the second resilient member 50 may be configured as a helical spring and may assist the latch 30 in returning to and/or from the latched position 32 (FIG. 3).

Further, although not shown, for this embodiment, the first shape memory alloy element 36 is coupled to the housing 20 and is transitionable between the first state 38 and the second state 40 in response to the first thermal activation signal 42 to thereby transition the camera 18 to the deployed position 28 (FIG. 2) so that the exterior surface 22 is not substantially flush with the body 14. That is, the first shape memory alloy element 36 may contract in length in response to the first thermal activation signal 42 to thereby transition the camera 18 to the deployed position 28. Stated differently, for this embodiment, the first shape memory alloy element 36 may deploy the camera 18 upon exposure to the first thermal activation signal 42. In one non-limiting example, the first shape memory alloy element 36 may be configured as a helical spring. In another non-limiting example, the first shape memory alloy element 36 may be configured as a straight wire.

For this embodiment, the first shape memory alloy element 36 may be continuously exposed to the first thermal activation signal 42 so that the camera 18 is maintained in the deployed position 28. For example, a trickle of electrical current may be continuously fed to the first shape memory alloy element 36 so that the first shape memory alloy element 36 may remain contracted in length and the camera 18 may remain deployed.

Alternatively or additionally, although not shown, the latch 30 may be disposed in the latched position 32 (FIG. 3) when the camera 18 is disposed in the deployed position 28 (FIG. 2). That is, the latch 30 may retain the camera 18 in the deployed position 28 and prevent the camera 18 from transitioning to the stowed position 26 (FIG. 1) when the latch 30 is in the latched position 32. Such functionality may be useful when the camera 18 is in the deployed position 28 and the vehicle 12 (FIG. 1) travels over a rough or uneven surface.

In addition, for this embodiment, the deployable camera system 110 may further include the second shape memory alloy element 52 transitionable between the first state 38 (FIG. 1) and the second state 40 (FIG. 2) in response to the second thermal activation signal 142 (FIG. 2) to thereby translate the latch 30 between the latched position 32 (FIG. 3) and the unlatched position 34 (FIG. 4). That is, the second shape memory alloy element 52 may contract in length in response to the second thermal activation signal 142 to thereby translate the latch to the latched position 32 when the camera is disposed in the deployed position 28. In one non-limiting example, the second shape memory alloy element 52 may be configured as a helical spring. In another non-limiting example, the second shape memory alloy element 52 may be configured as a straight wire.

Referring again to FIGS. 3 and 4, for this embodiment, the deployable camera system 110 may also include the second resilient member 50 coupled to the latch 30 and configured for translating the latch 30 between the latched position 32 (FIG. 3) and the unlatched position 34 (FIG. 4).

Figure 5:
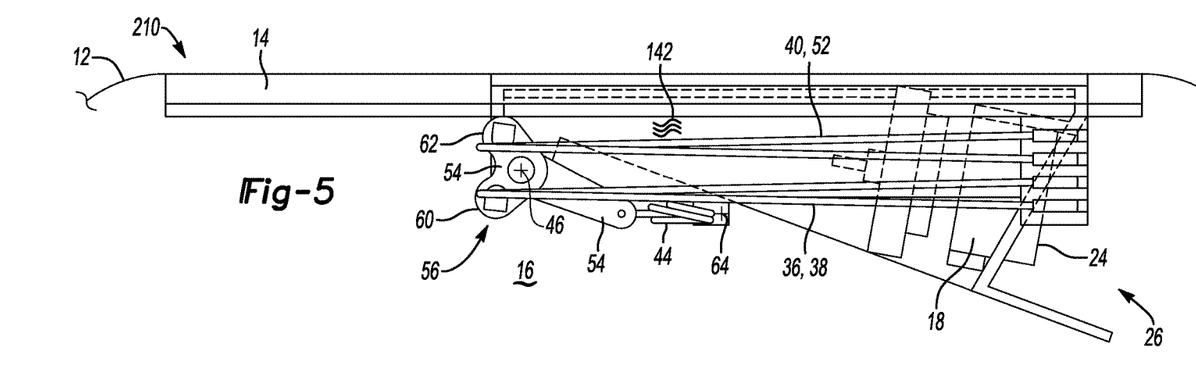
FIG. 5 is a schematic illustration of a side view of another embodiment of the deployable camera systems of FIGS. 1-4, wherein the camera is disposed in the stowed position.
Figure 6:
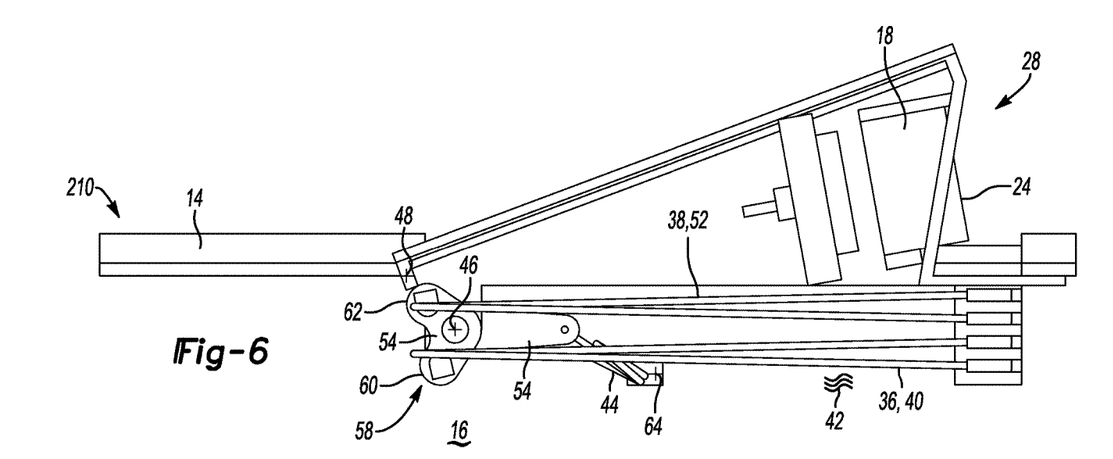
FIG. 6 is a schematic illustration of a side view of the deployable camera system of FIG. 5, wherein the camera is disposed in the deployed position.

Referring now to FIGS. 5 and 6, in another embodiment, the deployable camera system 210 includes a linkage 54 abutting the housing 20 and configured for pivoting about the first axis 46 between a first position 56 (FIG. 5) wherein the camera 18 is disposed in the stowed position 26, and a second position 58 (FIG. 6) wherein the camera 18 is disposed in the deployed position 28. The linkage 54 may include a first node 60 extending from the first axis 46 and a second node 62 spaced apart from the first node 60 and extending from the first axis 46. In addition, although not shown, the deployable camera system 210 may include a plurality of linkages 54.

With continued reference to FIGS. 5 and 6, in this embodiment, the deployable camera system 210 further includes the first shape memory alloy element 36 coupled to the linkage 54 and transitionable between the first state 38 (FIG. 5) and the second state 40 (FIG. 6) in response to the first thermal activation signal 42 (FIG. 6) to thereby pivot the housing 20 about the second axis 48 (FIG. 6) that is substantially parallel to the first axis 46 so that the linkage 54 pivots from the first position 56 (FIG. 5) to the second position 58 (FIG. 6). For example, the first shape memory alloy element 36 may be coupled to the first node 60. Therefore, as the first shape memory alloy element 36 transitions to the second state 40, the first shape memory alloy element 36 may contract in length in response to the first thermal activation signal 42 to thereby pivot the linkage 54 to the second position 58. Stated differently, the first shape memory alloy element 36 may contract in length, pull the linkage 54 to the second position 58, and thereby deploy the camera 18.

For this embodiment, as described with continued reference to FIGS. 5 and 6, the deployable camera system 210 further includes the second shape memory alloy element 52 coupled to the linkage 54 and transitionable between the first state 38 (FIG. 6) and the second state 40 (FIG. 5) in response to the second thermal activation signal 142 (FIG. 5) to thereby pivot the housing 20 about the second axis 48 (FIG. 6) so that the linkage 54 pivots from the second position 58 (FIG. 6) to the first position 56 (FIG. 5). For example, the second shape memory alloy element 52 may be coupled to the second node 62. Therefore, as the second shape memory alloy element 52 transitions to the second state 40, the second shape memory alloy element 52 may contract in length in response to the second thermal activation signal 142 to thereby pivot the linkage 54 to the first position 56. Stated differently, the second shape memory alloy element 52 may contract in length, pull the linkage 54 to the first position 56, and thereby stow the camera 18.

Further, although not shown, the deployable camera system 210 may include a plurality of first shape memory alloy elements 36 and a plurality of second shape memory alloy elements 52. For example, one of each of the plurality of first shape memory alloy elements 36 and the plurality of second shape memory alloy elements 52 may be coupled to a respective one of the plurality of linkages 54. In one non-limiting example, each of the first shape memory alloy element 36 and the second shape memory alloy element 52 may be configured as a straight wire. In another non-limiting example, each of the first shape memory alloy element 36 and the second shape memory alloy element 52 may be configured as a helical spring.

Referring again to FIGS. 5 and 6, for this embodiment, the deployable camera system 210 may further include the first resilient member 44 coupled to the linkage 54 and configured for pivoting about a third axis 64 that is substantially parallel to the second axis 48 (FIG. 6). For example, the first resilient member 44 may be configured as an over-center spring.

In addition, although not shown, the deployable camera system 210 may further include the latch 30 translatable between the latched position (shown generally at 32 in FIG. 3) wherein the camera 18 is not transitionable between the stowed position 26 (FIG. 5) and the deployed position 28 (FIG. 6), and the unlatched position (shown generally at 34 in FIG. 4) wherein the camera is transitionable between the stowed position 26 and the deployed position 28. Further, the deployable camera system 210 may include a third shape memory alloy element (not shown) coupled to the latch 30 and transitionable between the first state 38 and the second state 40 in response to a third thermal activation signal (not shown) to thereby translate the latch 30 between the latched position 32 and the unlatched position 34. The third shape memory alloy element (not shown) may be the same as or different from the first shape memory alloy element 36 and/or the second shape memory alloy element 52. In one non-limiting example, the third shape memory alloy element may be configured as a straight wire. In another non-limiting example, the third shape memory alloy element may be configured as a helical spring.

Although not shown, the third shape memory alloy element may contract in length in response to the third thermal activation signal (not shown) to thereby translate the latch 30 to the latched position 32. Alternatively, the third shape memory alloy element (not shown) may contract in length in response to the third thermal activation signal to thereby translate the latch 30 to the unlatched position 34.

Figure 8:
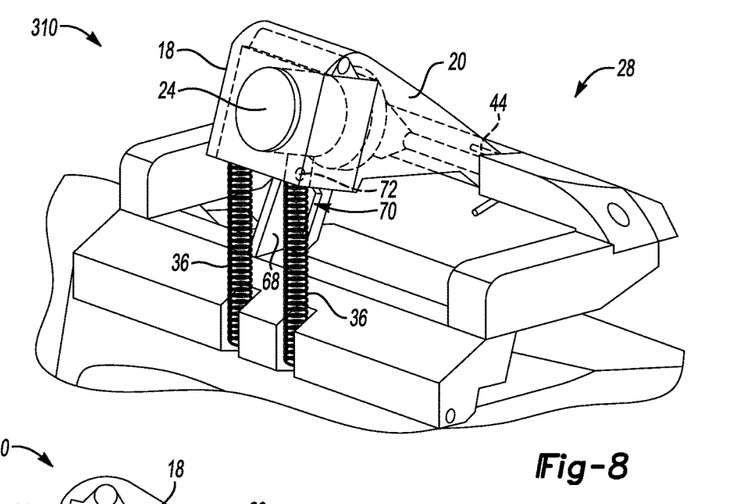
FIG. 8 is a schematic illustration of a perspective view of the deployable camera system of FIGS. 7A-7D, wherein the deployable camera system is disposed in the deployed position.
Figure 9A:
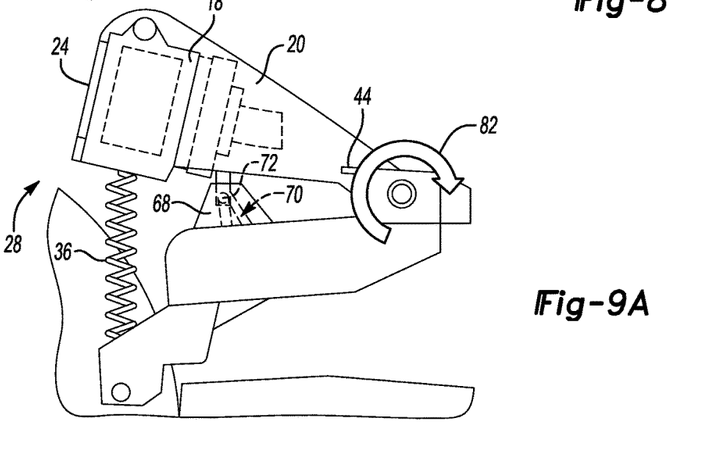
FIG. 9A is a schematic illustration of a side view of the deployable camera system of FIG. 8, wherein the deployable camera system is disposed in the deployed position.

Referring now to FIGS. 7A-7D, in yet another embodiment, the deployable camera system 310 includes a member 68 defining a channel 70 therein, and a pin 72 operably coupled to the camera 18 (FIG. 8) and translatable within the channel 70. For example, as best shown in FIG. 9A, the pin 72 may extend from the housing 20 and be disposed within the channel 70. The channel 70 may have any shape or configuration, such as, but not limited to, a heart-like shape. Further, although not shown, the deployable camera system 310 may include a plurality of members 68 defining a respective one of a plurality of channels 70. In addition, the deployable camera system 310 may include a corresponding plurality of pins 72. That is, although not shown, a respective one of the plurality of pins 72 may be disposed and translatable within the respective one of the plurality of channels 70.

In addition, with continued reference to FIGS. 7A-7D, the deployable camera system 310 includes the first shape memory alloy element 36 (FIG. 8) coupled to the pin 72 and transitionable between the first state (shown generally at 38 in FIGS. 7A and 7C) and the second state (shown generally at 40 in FIGS. 7B and 7D) in response to the first thermal activation signal 42 (FIGS. 7B and 7D) to thereby translate the pin 72 within the channel 70. For example, as best shown in FIG. 8, the first shape memory alloy element 36 may be hooked or otherwise affixed to the housing 20 and the pin 72 may extend from the housing 20.

More specifically, for this embodiment as described with reference to FIGS. 7A-9B, the first shape memory alloy element 36 (FIGS. 8-9B) translates the pin 72 between an initial position 74 (FIGS. 7A and 9B) wherein the camera 18 (FIGS. 8-9B) is disposed in the stowed position 26 (FIG. 9B), a secondary position 76 (FIG. 7B) wherein the camera 18 is disposed in the deployed position 28 (FIG. 9A) and the first shape memory alloy element 36 is in the second state 40, i.e., heated, a nominal position 78 (FIG. 7C) wherein the camera 18 is disposed in the deployed position 28 and the first shape memory alloy element 36 is in the first state 38, i.e., cooled, and a tertiary position 80 (FIG. 7D) wherein the camera 18 is disposed in the deployed position 28 and the first shape memory alloy element 36 is in the second state 40.

Figures 7A, 7B, 7C, 7D:
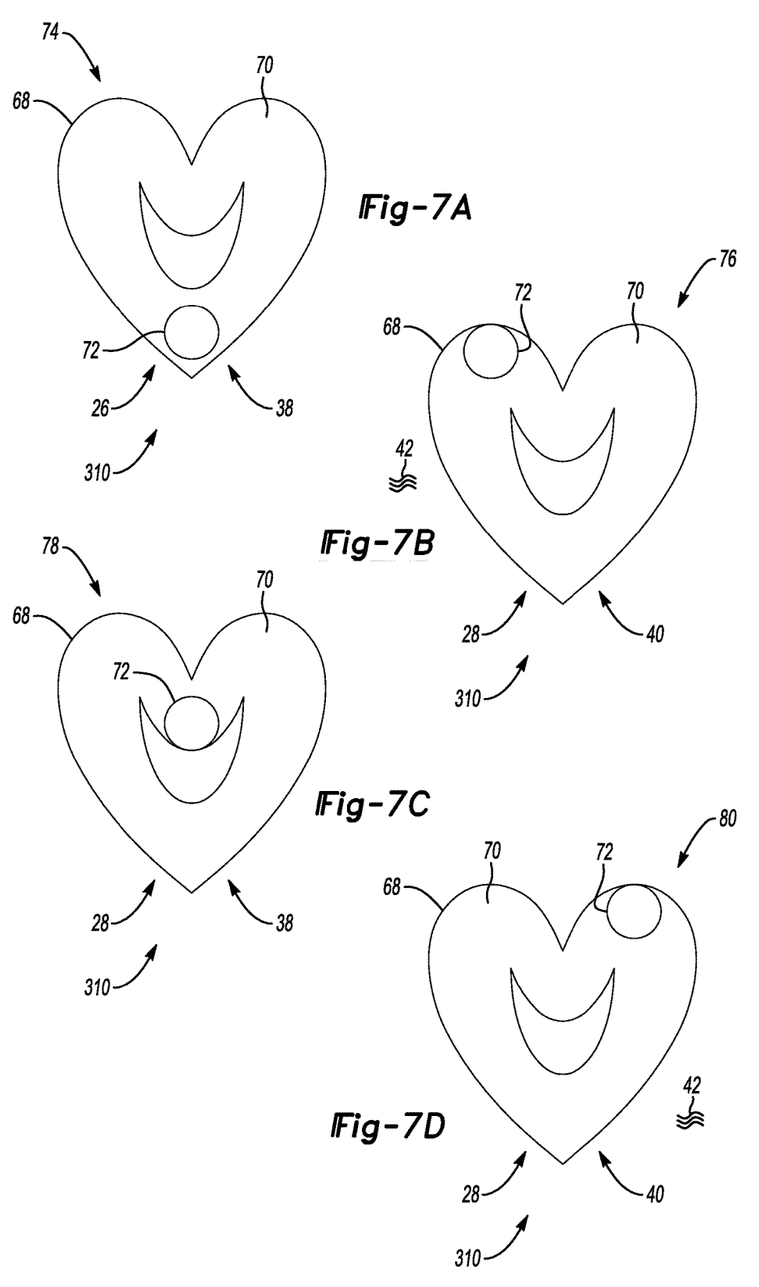
FIG. 7A is a schematic illustration of a side view of a portion of a further embodiment of the deployable camera systems of FIGS. 1-6, wherein the camera includes a pin disposed within a channel defined by a member, and the pin is disposed in an initial position.
FIG. 7B is a schematic illustration of a side view of the deployable camera system of FIG. 7A, wherein the pin is disposed in a secondary position.
FIG. 7C is a schematic illustration of a side view of the deployable camera system of FIGS. 7A and 7B, wherein the pin is disposed in a nominal position.
FIG. 7D is a schematic illustration of a side view of the deployable camera system of FIGS. 7A-7C, wherein the pin is disposed in a tertiary position.
Figure 9B:
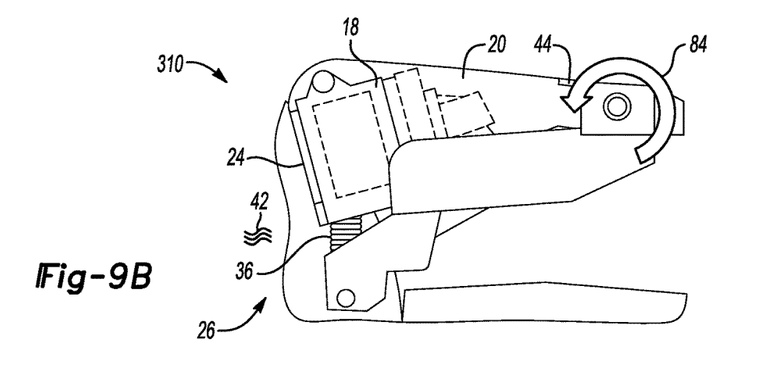
FIG. 9B is a schematic illustration of a side view of the deployable camera system of FIG. 8, wherein the deployable camera system is disposed in the stowed position.

In particular, with continued reference to FIGS. 7A-7D, the first shape memory alloy element 36 (FIG. 8) may contract in length in response to the first thermal activation signal 42 (FIGS. 7B and 7D) to thereby translate the pin 72 from the initial position 74 (FIG. 7A) to the secondary position 76 (FIG. 7B) and thereby transition the camera 18 (FIG. 8) to the deployed position 28 (FIG. 9A). Further, the first shape memory alloy element 36 may lengthen in the absence of the first thermal activation signal 42 to thereby translate the pin 72 from the secondary position 76 to the nominal position 78 (FIG. 7C). Likewise, the first shape memory alloy element 36 may contract in length in response to the first thermal activation signal 42 to thereby translate the pin 72 from the nominal position 78 to the tertiary position 80 (FIG. 7D). Finally, the first shape memory alloy element 36 may lengthen in the absence of the first thermal activation signal 42 to thereby translate the pin 72 from the tertiary position 80 to the initial position 74 and thereby transition the camera 18 to the stowed position 26 (FIG. 9B). That is, heating the first shape memory alloy element 36 may deploy the camera 18 to the deployed position 28, and cooling the first shape memory alloy element 36 may transition the camera 18 to the stowed position 26.

Conversely, although not shown, in another example, the first shape memory alloy element 36 (FIG. 8) may lengthen or elongate in length in the absence of the first thermal activation signal 42 to thereby translate the pin 72 from the initial position 74 (FIG. 7A) to the secondary position 76 (FIG. 7B) and thereby transition the camera 18 (FIG. 8) to the deployed position 28 (FIG. 9A). That is, the first thermal activation signal 42 may be removed from the first shape memory alloy element 36, and the first shape memory alloy element 36 may elongate in length to translate the pin 72 to the secondary position 76. Further, the first shape memory alloy element 36 may contract in length in response to the first thermal activation signal 42 to thereby translate the pin 72 from the secondary position 76 to the nominal position 78 (FIG. 7C). Likewise, the first shape memory alloy element 36 may lengthen in the absence of the first thermal activation signal 42 to thereby translate the pin 72 from the nominal position 78 to the tertiary position 80 (FIG. 7D). Finally, the first shape memory alloy element 36 may contract in length in response to the first thermal activation signal 42 to thereby translate the pin 72 from the tertiary position 80 to the initial position 74 and thereby transition the camera 18 (FIG. 8) to the stowed position 26 (FIG. 9B). That is, cooling the first shape memory alloy element 36 may deploy the camera 18 to the deployed position 28, and heating the first shape memory alloy element 36 may transition the camera 18 to the stowed position 26.

Therefore, as described with reference to FIGS. 9A and 9B, as the first shape memory alloy element 36 contracts in response to the first thermal activation signal 42 (FIG. 9B), the housing 20 may pivot in the direction of arrow 84 (FIG. 9B) so that the camera 18 is disposed in the stowed position 26 (FIG. 9B). Conversely, as the first shape memory alloy element 36 contracts again in response to the first thermal activation signal 42, the housing 20 may pivot in the direction of arrow 82 (FIG. 9A) so that the camera 18 is disposed in the deployed position 28 (FIG. 9A). As shown in FIGS. 8-9B, the deployable camera system 310 may also include the first resilient member 44 positioned or biased to translate the camera 18 between the stowed position 26 and the deployed position 28 in the direction of arrows 82 and 84.

For any of the embodiments described herein, the shape memory alloy elements 36, 52 may be actuated by exposing the shape memory alloy elements 36, 52 to the thermal activation signals 42, 142. Further, for vehicle applications, actuation of the shape memory alloy elements 36, 52 may be automatically triggered by sensors configured to detect, for example, temperature, water, ice, dust, system status, occupant mass, and the like. Alternatively or additionally, the shape memory alloy elements 36, 52 may be automatically triggered upon vehicle 12 start-up, or, for example, when the vehicle 12 shifts into reverse, activates a turn signal, etc. Furthermore, the shape memory alloy elements 36, 52 may be triggered solely upon operator input, i.e., on demand as determined by an operator.

In addition, for any of the embodiments described herein, the deployable camera systems 10, 110, 210, 310 may further include one or more printed circuit boards configured for providing the thermal activation signals 42, 142 to the respective shape memory alloy elements 36, 52 and/or monitoring and controlling operation of the deployable camera systems 10, 110, 210, 310.

Although not shown, any of the embodiments of the aforementioned deployable camera systems 10, 110, 210, 310 may further include a plurality of deployable lighting elements, e.g., a plurality of light emitting diode elements. Such deployable lighting elements may also be deployed and retracted into the deployed position 28 (FIG. 2) and the stowed position 26 (FIG. 1) as set forth above. Such deployable lighting elements may retract into the same cavity 16 (FIG. 1) or a different cavity 16 than the camera 18 (FIG. 1). Further, the deployable lighting elements may be disposed in another location within the passenger compartment of the vehicle 12 (FIG. 1), i.e., may not deploy from and retract into the steering column or body 14 (FIG. 1). Such deployable lighting elements may deploy and/or retract simultaneously with deployment and/or retraction of the camera 18. Alternatively, the deployable lighting elements may deploy and/or retract sequentially before or after deployment and/or retraction of the camera 18.

In addition, although not shown, any of the embodiments of the aforementioned deployable camera systems 10, 110, 210, 310 may further include additional components. Such components may also be deployed and retracted into the deployed position 28 (FIG. 2) and the stowed position 26 (FIG. 1) as set forth above. Such components may retract into the same cavity 16 (FIG. 1) or a different cavity 16 than the camera 18 (FIG. 1). Further, the components may be disposed in another location within the passenger compartment of the vehicle 12 (FIG. 1), i.e., may not deploy from and retract into the steering column or body 14 (FIG. 1). Such components may deploy and/or retract simultaneously with deployment and/or retraction of the camera 18. Alternatively, the components may deploy and/or retract sequentially before or after deployment and/or retraction of the camera 18.

The aforementioned deployable camera systems 10, 110, 210, 310 are compact, economical to manufacture and assemble into the vehicle 12 (FIG. 1), and are deployable into the cavity 16 (FIG. 1) to reduce obscuration of, for example, an instrument panel (not shown) of the vehicle 12. That is, the deployable camera systems 10, 110, 210, 310 are selectively deployable on-demand. Further, the shape memory alloy elements 36, 52 are quick to actuate, i.e., transition between the first state 38 (FIG. 1) and the second state 40 (FIG. 2). In addition, the deployable camera systems 10, 110, 210, 310 are free from electromagnetic interference.

While the best modes for carrying out the disclosure have been described in detail, those familiar with the art to which this disclosure relates will recognize various alternative designs and embodiments for practicing the disclosure within the scope of the appended claims.

The invention claimed is:

1. A deployable camera system for a vehicle, the deployable camera system comprising:
   a body defining a cavity therein;
   a camera including a housing having an exterior surface, wherein the camera is reversibly transitionable between
      a stowed position in which the camera is recessed into the cavity and the exterior surface is substantially flush with the body, and a deployed position in which the camera protrudes from the cavity and the exterior surface is not substantially flush with the body;
a member defining a channel therein;
a pin operably coupled to the camera and translatable within the channel; and
a first shape memory alloy element coupled to the pin and transitionable between a first state and a second state in response to a first thermal activation signal to thereby translate the pin within the channel between:
an initial position wherein the camera is disposed in the stowed position;
a secondary position wherein the camera is disposed in the deployed position and the first shape memory alloy element is in the second state;
a nominal position wherein the camera is disposed in the deployed position and the first shape memory alloy element is in the first state; and
a tertiary position wherein the camera is disposed in the deployed position and the first shape memory alloy element is in the second state.

2. The deployable camera system of claim 1, wherein the first shape memory alloy element:
contracts in length in response to the first thermal activation signal to thereby translate the pin from the initial position to the secondary position and thereby transition the camera to the deployed position;
lengthens to thereby translate the pin from the secondary position to the nominal position;
contracts in length in response to the first thermal activation signal to thereby translate the pin from the nominal position to the tertiary position; and
lengthens to thereby translate the pin from the tertiary position to the initial position and thereby transition the camera to the stowed position.

3. The deployable camera system of claim 1, wherein the pin extends from the housing and is disposed within the channel.

4. The deployable camera system of claim 1, wherein the channel has a heart-like cross-section.

5. The deployable camera system of claim 1, wherein the first shape memory alloy element is affixed to the housing.

6. The deployable camera system of claim 1, wherein the first shape memory alloy element lengthens to thereby translate the pin from the initial position to the secondary position and thereby translate the camera to the deployed position.

7. The deployable camera system of claim 6, wherein the first shape memory alloy element contracts in length in response to the first thermal activation signal to thereby translate the pin from the secondary position to the nominal position.

8. The deployable camera system of claim 7, wherein the first shape memory alloy element lengthens to thereby translate the pin from the nominal position to the tertiary position.

9. The deployable camera system of claim 8, wherein the first shape memory alloy element contracts in length in response to the first thermal activation signal to thereby translate the pin from the tertiary position to the initial position and thereby transition the camera to the stowed position.

10. The deployable camera system of claim 1, wherein the first shape memory alloy element contracts in response to the first thermal activation signal such that the housing pivots in a first direction and the camera is disposed in the stowed position.

11. The deployable camera system of claim 10, wherein the first shape memory alloy element contracts again in response to the first thermal activation signal such that the housing pivots in a second direction that is opposite the first direction and the camera is disposed in the deployed position.

12. The deployable camera system of claim 1, further including a first resilient member biased to translate the camera between the stowed position and the deployed position.

13. The deployable camera system of claim 1, further including a plurality of deployable lighting elements each retractable into and deployable from the cavity.

* * * * *